United States Patent
Drake et al.

(10) Patent No.: US 11,945,749 B2
(45) Date of Patent: Apr. 2, 2024

(54) HIGH TEMPERATURE SEALANT AND METHODS THEREOF

(71) Applicant: Corning Incorporated, Corning, NY (US)

(72) Inventors: Melinda Ann Drake, Corning, NY (US); Robert Michael Morena, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 1177 days.

(21) Appl. No.: 16/612,897

(22) PCT Filed: May 8, 2018

(86) PCT No.: PCT/US2018/031613
§ 371 (c)(1),
(2) Date: Nov. 12, 2019

(87) PCT Pub. No.: WO2018/208785
PCT Pub. Date: Nov. 15, 2018

(65) Prior Publication Data
US 2020/0062637 A1  Feb. 27, 2020

Related U.S. Application Data

(60) Provisional application No. 62/505,211, filed on May 12, 2017.

(51) Int. Cl.
*C04B 37/00* (2006.01)
*C01B 25/37* (2006.01)
(Continued)

(52) U.S. Cl.
CPC ............... *C03C 8/24* (2013.01); *C01B 25/37* (2013.01); *C03B 23/207* (2013.01); *C03C 3/16* (2013.01);
(Continued)

(58) Field of Classification Search
CPC ......... C03C 27/00; C03C 27/04; C03C 27/06; C03C 27/10; C03C 27/044; C03C 27/042;
(Continued)

(56) References Cited

U.S. PATENT DOCUMENTS 5,094,677 A  3/1992  Morena
6,023,006 A  2/2000  Fiquet et al.
(Continued)

FOREIGN PATENT DOCUMENTS

TW        201246527 A  * 11/2012  ............. C03C 27/06

OTHER PUBLICATIONS

TW201246527A machine translation. Published Nov. 16, 2012 (Year: 2012).*
(Continued)

*Primary Examiner* — Alex B Efta

(57) ABSTRACT

A method of making a stoichiometric monazite ($LaPO_4$) composition or a mixture of $LaPO_4$ and $LaP_3O_9$ composition, as defined herein. Also disclosed is a method of joining or sealing materials with the compositions, as defined herein.

11 Claims, 12 Drawing Sheets

(51) Int. Cl.
*C03B 23/207* (2006.01)
*C03C 3/16* (2006.01)
*C03C 8/08* (2006.01)
*C03C 8/24* (2006.01)
*C04B 37/02* (2006.01)

(52) U.S. Cl.
CPC .............. *C03C 8/08* (2013.01); *C04B 37/003* (2013.01); *C04B 37/023* (2013.01); *C03C 2207/00* (2013.01); *C04B 2237/10* (2013.01); *C04B 2237/343* (2013.01); *C04B 2237/365* (2013.01); *C04B 2237/403* (2013.01); *C04B 2237/765* (2013.01)

(58) Field of Classification Search
CPC .... C03C 8/00; C03C 8/14; C03C 8/24; C03C 8/22; C04B 37/003; C04B 37/04; C04B 2237/10
See application file for complete search history.

(56) References Cited

U.S. PATENT DOCUMENTS

| | | |
|---|---|---|
| 6,716,407 B2 | 4/2004 | Davis et al. |
| 6,770,111 B2 | 8/2004 | Morena et al. |
| 7,871,716 B2 | 1/2011 | Vance |
| 8,850,851 B2 | 10/2014 | Lamberson et al. |
| 9,556,055 B2 | 1/2017 | Likitvanichkul et al. |
| 9,573,840 B2 | 2/2017 | Drake et al. |
| 9,586,860 B2 | 3/2017 | Ukrainczyk |
| 2013/0049062 A1* | 2/2013 | Hatano ................. H10K 59/131 257/770 |
| 2014/0227511 A1* | 8/2014 | Mazany .............. C04B 41/5022 428/323 |

OTHER PUBLICATIONS

Boakye et al; "Monazite Coatings on Fibers: II, Coating Without Strength Degradation"; J. Am. Ceram. Soc., 84 [12], pp. 2793-2801 (2001.
Boakye et al; "Monazite Coatings on SiC Fibers I: Fiber Strength and Thermal Stability"; J. Am. Ceram. Soc., 89; pp. 3475-3480; (2006.
Clavier et al; "Crystal Chemistry of the Monazite Structure"; Journal of the European Ceramic Society, 31 pp. 941-976 (2011.
International Search Report and Written Opinion of the Internaitonal Searching Authority; PCT/US2018/031613; dated Oct. 11, 2018; 16 Pages; European Patent Office.
Ren et al; "Thermal Conductivity and Mechanical Properties Of YSZ/LaPO4 Composites"; J. Mater. Sci. 49; pp. 2243-2251 (2014.
Thamboon et al; "The Induced X(2) in Thermally Poled Lanthanum Phosphate Glass"; Optical Materials; 31; pp. 1228-1230 (2009.

* cited by examiner

HIGH TEMPERATURE SEALANT AND METHODS THEREOF

This application claims the benefit of priority under 35 U.S.C. § 371 of International Application No. PCT/US2018/031613, filed on May 8, 2018, which claims the benefit of priority to U.S. Provisional Application No. 62/505,211, filed on May 12, 2017, the contents of all of which are relied upon and incorporated herein by reference in their entirety.

CROSS REFERENCE TO RELATED APPLICATIONS

The disclosure relates to commonly owned and assigned application(s) or patent(s): U.S. Pat. No. 9,573,840, issued Feb. 21, 2017, to Drake, et al., entitled "Antimony-free glass, antimony-free frit and a glass package that is hermetically sealed with the frit", but does not claim priority thereto.

The entire disclosure of each publication or patent document mentioned herein is incorporated by reference.

BACKGROUND

The disclosure relates to a composition that can be used for, for example, for joining, sealing, or as an adhesive, and to methods of making and using the composition.

SUMMARY

In embodiments, the disclosure provides:

a joining, sealing, or adhesive composition, which is particularly stable at elevated temperatures such as used in glass or glass-ceramic manufacturing;

a method of making the composition such as monazite by, for example, reactive-ceramming of fits; and a method of using the composition, for example, for joining, sealing, or as an adhesive, in refractory, abrasive, or resistor applications.

BRIEF DESCRIPTION OF THE DRAWINGS

In embodiments of the disclosure.

DETAILED DESCRIPTION

Figure 1:
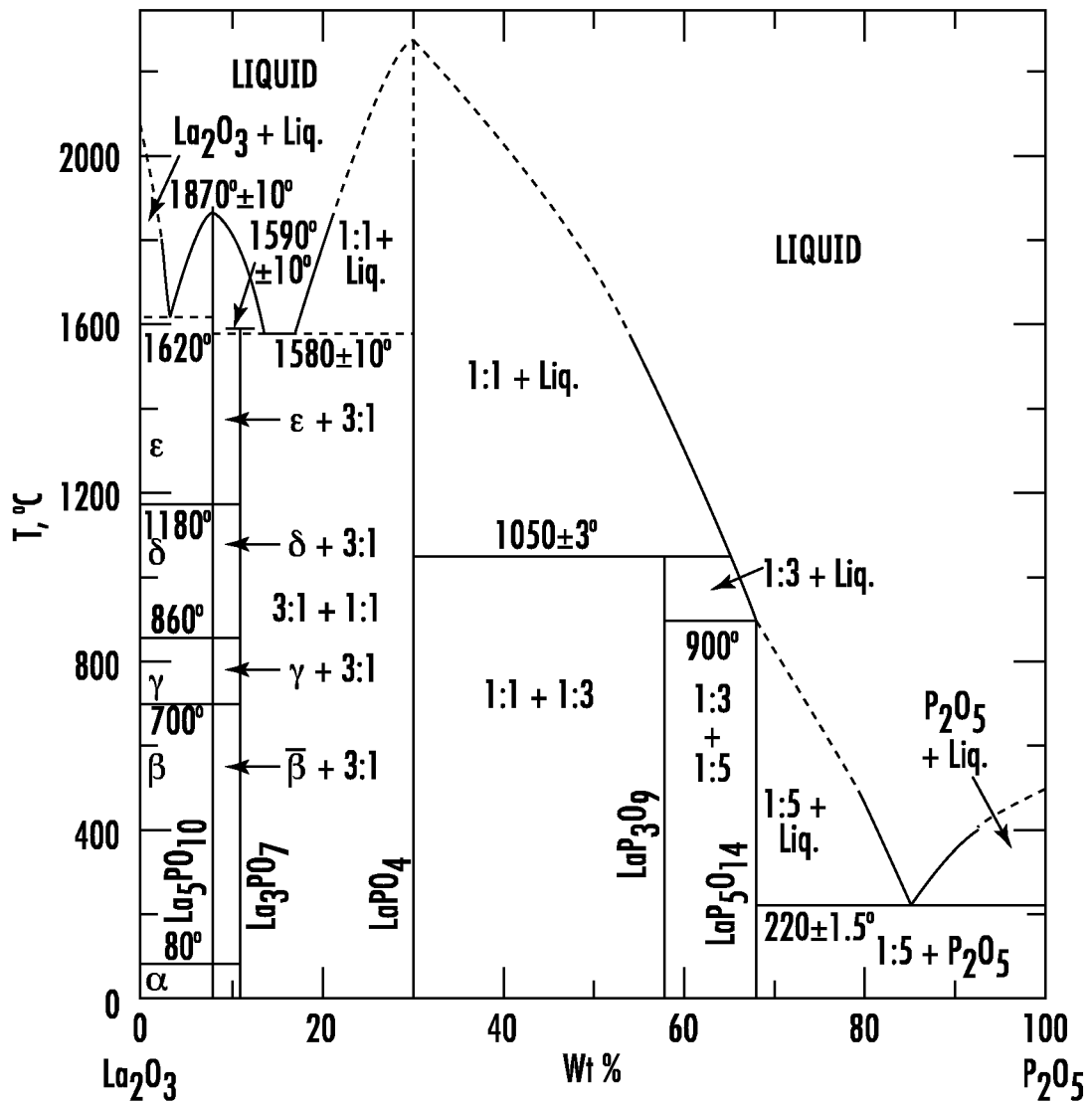
FIG. 1 shows a $La_2O_3$—$P_2O_5$ binary (wt. %).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Stoichiometric blend" and like terms refer to pure monazite blend comprised of, for example, a 30:70 weight ratio of $La_2O_3$:$P_2O_5$.

"Off-stoichiometric blend" and like terms refer to a compound or composition that is slightly different from the abovementioned pure monazite blend comprised of, for example, a 25:75 mol ratio or a 35:65 weight ratio of $La_2O_3$:$P_2O_5$.

"Glass frit," "frit," and like terms refer to a ceramic composition that has been fused in a fusing oven, quenched to form a glass, and granulated. Frits can form a part of the batches used in compounding enamels and ceramic glazes, or for glass frit bonding; the purpose of a pre-fusion can be, for example, to render any soluble or toxic components insoluble by causing them to combine with silica and other added oxides.

"Ceramming," "ceram," and like terms refer to a glass substrate (having selected properties such as crystalline content) is subjected to an additional thermal cycle at high temperatures. The crystals, contained in the substrate, grow and modify the molecular structure of the substrate until the substrate forms a correct balance (i.e., equilibrium) between the crystalline phase and residual glass in the substrate. Ceramming has also been described in, for example, U.S. Pat. No. 9,556,055. A glass sheet can be cerammed, that is, heat treated to produce a desired glass-ceramic product. A ceram cycle can include the following steps: 1) heating the glass sheet from room temperature to a first temperature at a first heating rate; 2) holding the glass sheet at the first temperature for a predetermined amount of time; 3) heating the glass sheet from the first temperature to a second temperature at a second heating rate; 4) holding the glass sheet at the second temperature for a predetermined amount of time; and 5) cooling the glass sheets from the second temperature to room temperature at a first cooling rate.

"Reactive-ceramming," and like terms refer to the combination or reaction of a glass frit and at least one reactant to produce a final crystalline phase. Reactive-ceramming has also been described in, for example, commonly owned U.S. Pat. No. 8,850,851.

"Hermeticity," "hermetic," "hermetic seal," "hermeticity test," and like terms refer to the quality of something such as a container, structure, or like vessel or construct, being airtight. The hermeticity or quality of a satisfactory hermetic seal prepared by the compositions and methods of the disclosure can have, for example, a leak rate of less than or equal to $1\times10^{-1}$ atm-cm$^3$/sec.

"Consisting essentially of" in embodiments refers, for example, to the disclosed ceramic compositions, to a method of making or using the disclosed compositions, or a formulation of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, excessive departures from the disclosed batch proportions, particle sizes, heating profiles, firing profiles, reactive-ceramming temperatures, melting temperatures and like considerations.

"Consisting of" in embodiments refers, for example, to the disclosed ceramic compositions, to a method of making or using the disclosed compositions, or a formulation of the disclosure, and include only the components or steps recited in the claim or claims.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

U.S. Pat. No. 6,716,407, entitled "Monazite-based coatings for thermal protection systems," mentions monazite or xenotime-based blanket coatings that stiffen ceramic fabrics without causing embrittlement at temperatures of at least as high as 2400° F. (i.e., 1315.5° C.). Methods for making the coatings are mentioned and comprise the synthesis of high purity, monazite and xenotime powders with a stoichiometric ratio of metal to phosphorous of about 1:1. A ceramic method was used and the product powders are believed to be porous. This reference doesn't mention a method of making articles as provided in the present disclosure.

U.S. Pat. No. 7,871,716, entitled "Damage tolerant gas turbine component," mentions a damage tolerant component for use in a high temperature combustion gas environment. The component includes a plurality of ceramic tiles (94) bonded to a substrate (92) for isolating any impact damage to the damaged tile(s). A grout (98) may fill gaps between adjacent tiles to blunt any crack tip extending from a damaged tile. Ceramic tile insulation may be applied in two layers (56, 58) with the material properties of the two layers being different, such as with a bottom layer selected for its thermal insulating properties and a top layer selected for its impact resistance properties. A layer of sealing material (100) may be applied over at least a portion of the ceramic tiles. The reference doesn't mention pure or 100% monazite nor a non-stoichiometric composition as provided in the present disclosure.

Boakye, et al., "Monazite Coatings on SiC Fibers I: Fiber Strength and Thermal Stability", *J Am. Ceram. Soc.,* 89:3475-3480, 11, Nov. 2006, mentions coating monazite on SiC Fibers; and Boakye, et al., "Monazite Coatings on Fibers: II, Coating without Strength Degradation", *J Am. Ceram. Soc.,* 84:2793-2801, 12, Dec. 2001, mentions coating rhabdophane (LaPa$_4$·xH$_2$O) sols to apply monazite coatings to selected fibers.

In embodiments, the disclosure provides a method of making a stoichiometric monazite (LaPO$_4$) composition, comprising:

preparing La-phosphate frit particles comprising: melting a mixture of La$_2$O$_3$:P$_2$O$_5$ in a mole ratio of 30:70 at a suitable melting temperature (T$_{melt}$), for example, of from 1400 to 1700° C. such as 1600° C.; and then pouring, rolling, and milling the resulting melt mixture to frit particles of a suitable particle size, for example, a mean particle size of 10 to 15 microns; and heating the resulting frit particles in admixture with a lanthanum source (such as La$_2$O$_3$) to a reactive-ceramming temperature (T$_1$) for a sufficient time to form a stoichiometric LaPO$_4$, i.e., pure LaPO$_4$ or monazite, or a non-stoichiometric mixture of LaPO$_4$, for example, ⅔ LaPO$_4$ (monazite) and ⅓ LaP$_3$O$_9$ (by weight basis), wherein T$_{melt}$ is greater than T$_1$.

A suitable melting temperature (T$_{melt}$) of from 1400 to 1700° C., a reactive-ceramming temperature (T$_1$) can be, for example, of from 1200 to 1500° C., and for a sufficient time.

A suitable particle frit size is a mean particle size of 10 to 15 microns, for example, 6 to 20 microns.

In embodiments, the disclosure provides a method of making a mixture of LaPO$_4$ glass and La$_2$O$_3$, comprising:

preparing La-phosphate frit particles comprising: melting a mixture of La$_2$O$_3$:P$_2$O$_5$ in a mole ratio of from 25:75 to 20:80 at a suitable melting temperature (T$_{melt}$), for example, of from 1400 to 1700° C. such as 1600° C.; and then pouring, rolling, and milling the resulting melt mixture to frit particles of a suitable particle size, for example, a mean particle size of 10 to 15 microns; and heating the resulting frit particles in admixture with a lanthanum source such as $La_2O_3$, to a reactive-ceramming temperature ($T_1$) for a sufficient time to form the mixture of $LaPO_4$, for example, ⅔ $LaPO_4$ (monazite) and ⅓ $LaP_3O_9$ (by weight basis), wherein $T_{melt}$ is greater than $T_1$.

The suitable melting temperature ($T_{melt}$) can be, for example, of from 1400 to 1700° C., a reactive-ceramming temperature ($T_1$) is of from 1200 to 1500° C., and for a sufficient time.

The suitable particle frit size can be a mean particle size of from 1 to 25 microns, for example, of from 10 to 15 microns, of from 6 to 20 microns, and like sizes, including intermediate values and ranges.

In embodiments, the disclosure provides a sealing composition comprising a stoichiometric $LaPO_4$ or a non-stoichiometric $LaPO_4$ mixture of La-phosphate frit and a lanthanum source such as $La_2O_3$.

In embodiments, the disclosure provides a method of joining and sealing two objects, comprising:
  contacting a first and a second object with a sealing compositions comprising a mixture of La-phosphate glass frit (see, e.g., glass frit Examples 1 and 2) and a lanthanum source such as $La_2O_3$ or $LaCO_3$ (see, e.g., glass frit Examples 1 and 2, and frit and La source mixtures in Examples 4 and 5);
  a first heating of the contacted first and second objects and the sealing composition of from 1200 to 1500° C., and holding at this temperature to densify for from 2 to 8 hrs, for example, 4 hrs; and
  a second heating of the first heated objects and the sealing composition to of from 1500 to 1600° C., and holding at this temperature for from 2 to 8 hrs, for example, 4 hrs.

In embodiments, the first and second objects are the same or different material.

In embodiments, the first and second objects are selected from at least one of silicon carbide, aluminum oxide, zirconium, or combinations thereof.

In embodiments, the first and second objects can be, for example, respective ends of furnace tubes.

In embodiments, the first and second objects can be, for example, selected from sheets, tubes, fibers, cylinders, and like geometries or utilities, of the same or different material.

In embodiments, the present disclosure is advantaged in several aspects, including for example:
  a high temperature sealant is provided that is hermetic at 1500°, and has a melting temperature at greater than 2000°;
  the sealant is based on the formation of monazite ($LaPO_4$) using as one of the reactants a low temperature glassy frit;
  the sealant composition can be used to seal, for example, SiC furnace tubes, end-to-end such as in a splice; and
  the sealant composition can be used in many different high temperature sealing applications, for example, high temperature mortar or refractory bricks in a high temperature furnace or like structure and condition.

In embodiments, the disclosure provides a method of making a sealant, which sealant is stable at high temperature, as defined herein, and is hermetic.

In embodiments, the disclosure provides a reactive-ceramming method for making the sealant. The reactive-ceramming method has been used previously to synthesize refractory compounds such as pollucite ($Cs_2O \cdot Al_2O_3 \cdot 4SiO_2$, $T_m$ about 2800° C.), and xenotime ($YPO_4$, a sister compound to monazite, with $T_m$=2150° C.) (see, for example, commonly owned and assigned U.S. Pat. No. 5,094,677, to Morena, "Preparation of Pollucite Ceramics"; U.S. Pat. No. 6,770,111 to St Julien, et al., "Pollucite-based Ceramics with Low CTE"; and U.S. Pat. No. 8,850,851 to Lamberson, et al., "Making xenotime ceramics by reactive ceramming of glass frits").

In embodiments, the seal preferably can withstand temperatures as high as 1500° C. or more, and is hermetic.

The rare earth phosphate monazite ($LaPO_4$) is an extremely refractory and stable compound with a melting temperature ($T_m$) of 2250° C. Because of its extreme refractoriness, the synthesis of this compound by a traditional ceramic powder route calls for a high temperature to obtain phase pure quantities from starting reactants. Similarly, the synthesis of this material by a glass-ceramic route also would require high process temperatures to melt the precursor glass. The glass-ceramic route would also be unlikely to yield phase pure quantities.

Monazite is a highly refractory material that is difficult to synthesize in reasonable purity by a glass-ceramic route. It is unlikely that stoichiometric monazite, having a 50 mole % $La_2O_3$, could even form a glass. If so, since the liquidus is 2300° C., any glass would have to be melted at least as high as 2300° C., which demonstrates the impracticality of a glass-ceramic route to obtain monazite. Similar difficulties exist with obtaining sintered monazite articles by the ceramic route. The disclosed reactive-ceramming approach provides a route to synthesize a high temperature compound (monazite) that cannot be readily and easily prepared by alternative methods.

Three possible synthetic routes are summarized in the following schemes:
  ceramic: reactant 1+reactant 2→ceramic product
  glass-ceramic: precursor glass→glass-ceramic product+ residual glass
  reactive-ceramming: reactant 1+glass frit→reactive-cerammed product An advantage of the reactive-ceramming route over the two other routes is that the synthesis can be completed at a much lower temperature. This is indicative of a diffusional process with the glass frit that occurs at a higher rate than the other techniques as a result of viscous flow. This becomes especially significant when the reactant glass is a relatively low temperature glass.

In embodiments, monazite was selected as a possible candidate sealant material to join sections of SiC pipe because of its high temperature compatibility with SiC, and since monazite has been used as an oxidation-protective coating on SiC fibers in high temperature fiber-reinforced composites, such as in a sol-gel process. Although monazite itself has a relatively high coefficient of thermal expansion (e.g., CTE of about $90 \times 10^{-7}/°$ C.) compared to SiC (CTE of $35 \times 10^{-7}/°$ C.), this CTE difference is not expected to be an issue for high temperature sealing applications such as where the sealed members are not cooled, for example, below of from 600 to 800° C. (see for example, Boakye, et al., "Monazite Coatings on SiC Fibers I, supra.; and Boakye, et al., "Monazite Coatings on Fibers: II, supra.).

Stated alternatively, the disclosed sealing or joining composition has a high temperature CTE compatibility because of the presence of a liquid phase and a low temperature CTE incompatibility because of the absence of a liquid phase.

General Procedures

A. Synthesis of Monazite or Mixtures of Monazite

FIG. 1 shows the $La_2O_3$—$P_2O_5$ binary (in wt. %), with stoichiometric monazite ($LaPO_4$) appearing at approximately 30% $P_2O_5$. Note monazite ($LaPO_4$) at 30 wt % $P_2O_5$ and melting temperature of 2250° C.

Figure 2:
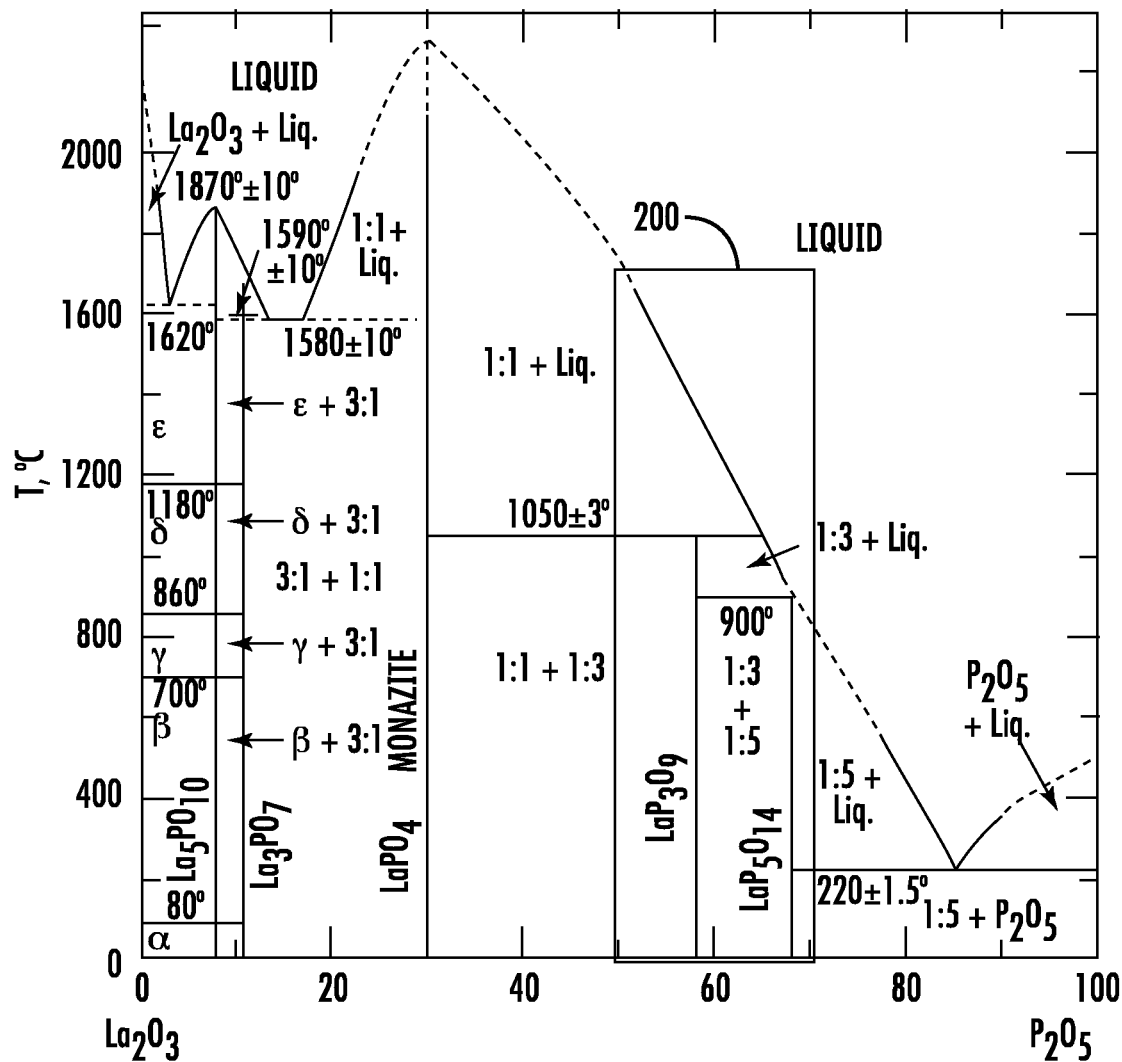
FIG. 2 shows a $La_2O_3$—$P_2O_5$ binary (wt. %), showing a region (200) of potential reactant frits.

FIG. 2 shows the same binary of FIG. 1 and additionally a region (200) that indicates reactant frit compositions having of from 50 to 70 wt % $P_2O_5$ that can react with 30 to 50 wt % $La_2O_3$ to form monazite. These reactant frit compositions were selected because they are pourable melts at less than or equal to 1650° C. and are not excessively high in $P_2O_5$ to cause hygroscopicity or durability issues.

The reaction of the present method of making can be represented by:

$La_2O_3$+La-phosphate frit→$LaPO_4$.

Precursor frits (such as those mentioned in Examples 1, 2, and 3) were melted in, for example, 800 g batches. The starting materials for preparing the precursor frits were phosphorus pentoxide and technical grade (98.6% pure) lanthanum oxide in the weight percentages indicated. Melting the starting materials was accomplished, for example, in covered Pt crucibles for 12 to 16 hrs at 1600° C., and then the melts were poured as rolled ribbon, and then ball-milled, for example, for about 8 hr or until a mean particle size of 10 to 15 microns or −325 mesh (i.e., 44 microns) was realized. Two specific precursor frits were selected and their compositions are listed in Table 1, along with the specific reaction couple with $La_2O_3$ called for, to obtain stoichiometric $LaPO_4$.

In embodiments, the composition ($La_2O_3$:$P_2O_5$ mol %=20:80) of Example 1, a base glass composition, was less than ideal because it was hygroscopic.

In embodiments, the composition ($La_2O_3$:$P_2O_5$ mol %=30:70) of Example 2, another base glass composition, was superior because it was not hygroscopic.

In embodiments, the composition Example 3 was a repeat of Example 2 and was likewise superior because it was not hygroscopic.

TABLE 1

Precursor frits and reaction couples.

| | Composition | | | | |
|---|---|---|---|---|---|
| Precursor frit | Wt. % | | Mole % | | Poured |
| designation | $La_2O_3$ | $P_2O_5$ | $La_2O_3$ | $P_2O_5$ | glass |
| Example 1 base glass | 36.5 | 63.5 | 20 | 80 | clear, but sticky |
| Example 2 (repeated as Example 3) base glass | 49.6 | 50.4 | 30 | 70 | opal (XRD amorphous) |

TABLE 2

Reactive-ceramming blends and initial results.

| | Wt. ratio of starting blends | | Firing | |
|---|---|---|---|---|
| Blend No. | Frit | $La_2O_3$ | schedule | XRD results |
| Example 4 (i.e., Example 1 base glass frit and $La_2O_3$) | 47.8 | 52.2 | 1200° for 4 hr then 1500° C. for 4 hr | monazite and very minor trace of an unknown phase |
| Example 5 (i.e., Example 2 base glass frit and $La_2O_3$) | 59.0 | 41.0 | 1200° for 4 hr then 1500° C. for 4 hr | pure monazite |

TABLE 3

Reaction sequence and XRD results for reaction couple Example 5b.

| Reaction temperature (° C.) for 4 hrs | Phase assemblage (max XRD intensity, counts) |
|---|---|
| 600 | $La_2O_3$ (8,504), $LaP_3O_9$ (6,526), $LaPO_4$ (1,726), $La(OH)_3$ (984) + glass |
| 800 | $La_3PO_7$ (10,343), $LaPO_4$ (10,053), $LaP_3O_9$ (8,988) + glass |
| 1000 | $LaPO_4$ (33,466), $LaP_3O_9$ (1,841) + $La_3PO_7$ (134) |
| 1200 | $LaPO_4$ (35,791) |
| 1400 | $LaPO_4$ (43,968) |

Figure 3:
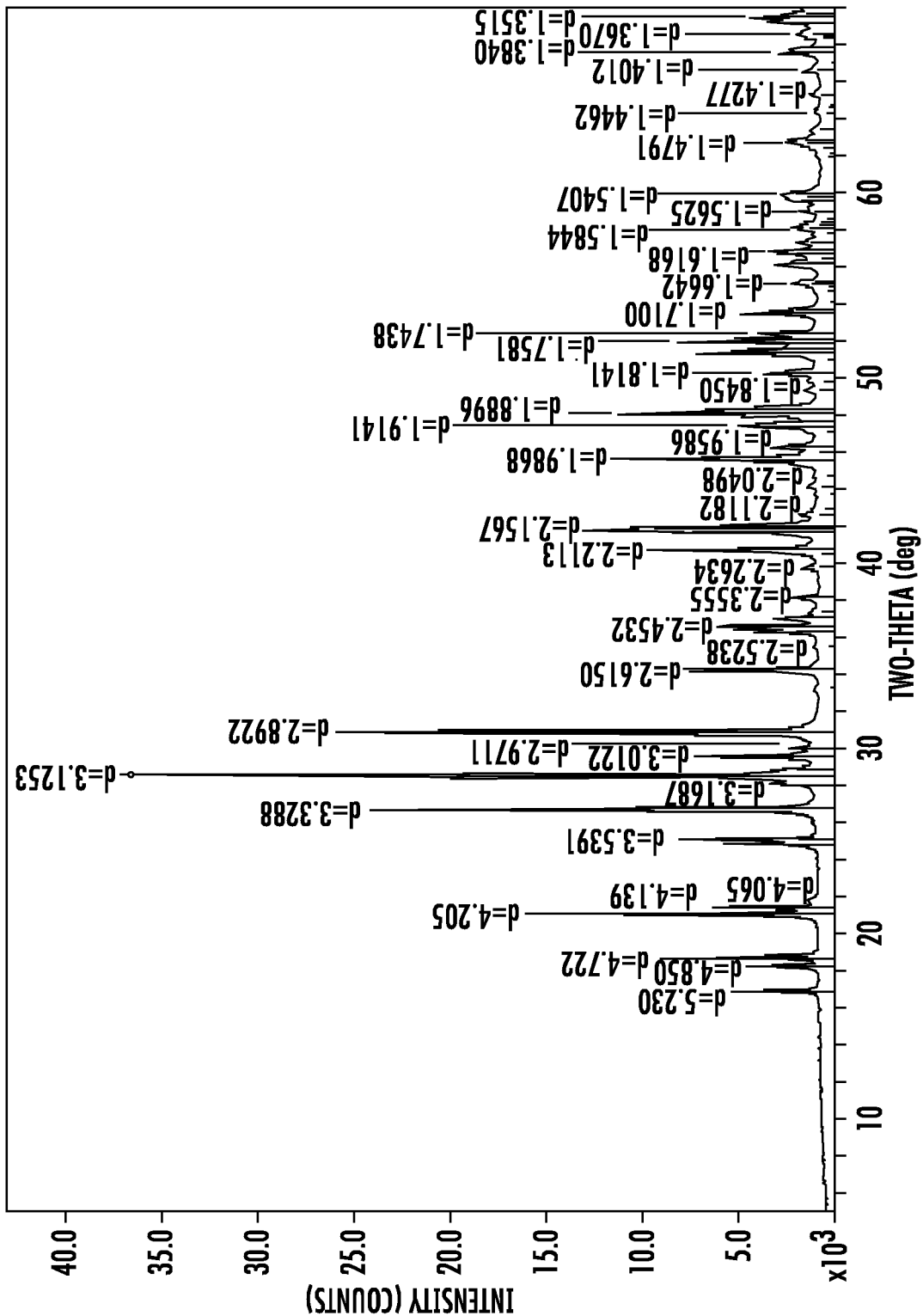
FIG. 3 shows an XRD of a monazite reaction couple of the composition of Example 4 after firing to 1500° C. for 4 hr (with a 4 hr hold at 1200° C.).
Figure 4:
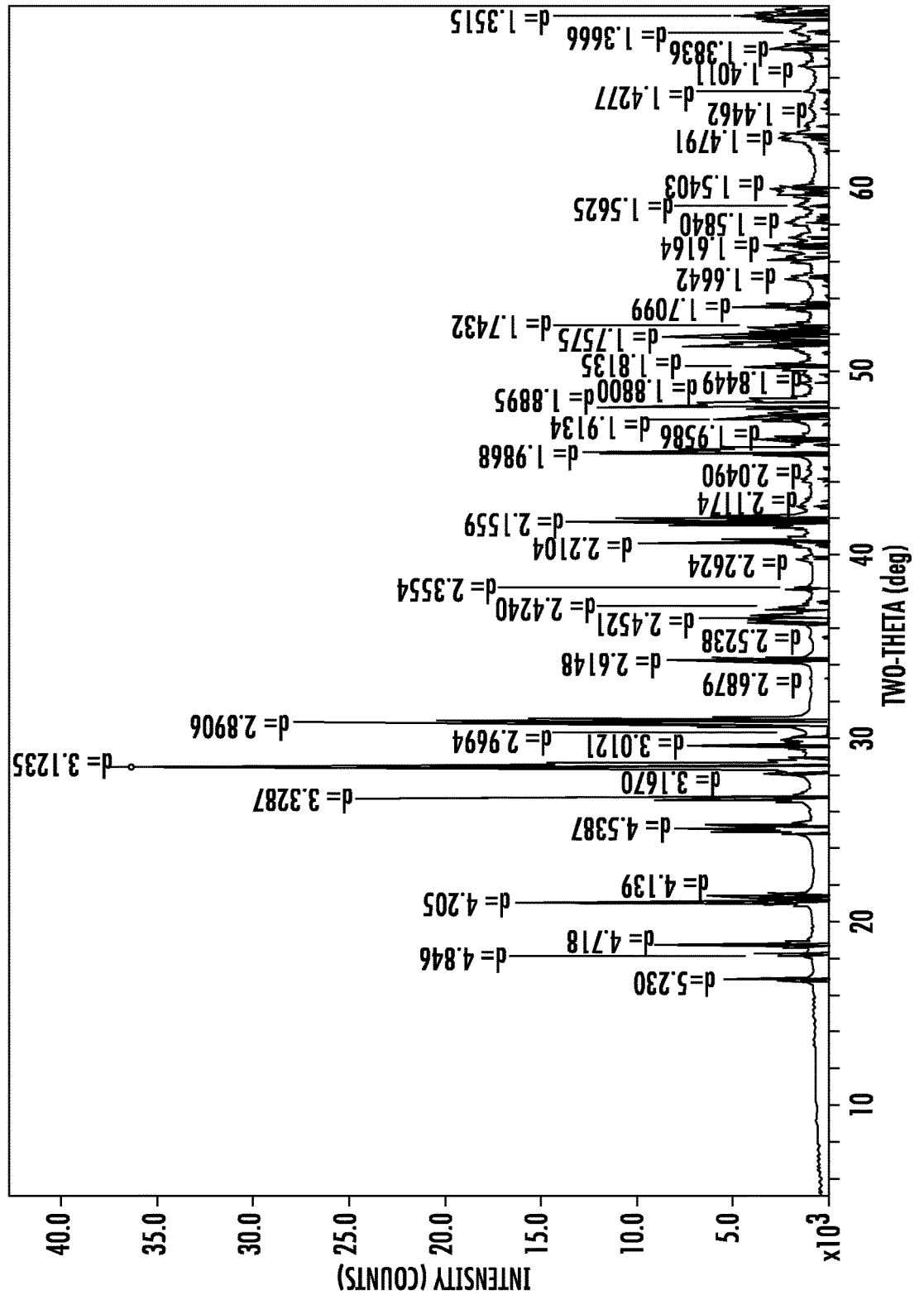
FIG. 4 shows an XRD of a monazite reaction couple of a sample of Example 5 after firing to 1500° C. for 4 hr (with a 4 hr hold at 1200° C.).

XRD of the two blends after firing to 1200° for 4 hr and then 1500° for 4 hr are shown in FIGS. 3 and 4. All peaks in both samples were identified as monazite. There is, however, a very minor unidentified peak (520) present at about 22° 2Θ in sample of Example 4 (500) that was absent in sample Example 5 (510) (see overlay in FIG. 5). No residual glass appears to be present in either sample after the firing.

Based on the very minor unidentified peak in sample of Example 4, and that the precursor of Example 1 glass was slightly hygroscopic because of a high $P_2O_5$ content, further evaluation was focused on reaction couples involving Example 2. To investigate the reaction sequence and the temperature range of monazite formation, the starting batch of Example 2 was again melted as Example 3 and stoichiometric mixture of 59 frit:41 $La_2O_3$ monazite reaction couples were prepared as blend sample in Example 5b (a repeat of Example 5). Samples were then fired over a range of temperatures and then analyzed by XRD. Results are shown in Table 3.

Note in Table 3, that monazite ($LaPO_4$) is present at temperatures as low as 600° C., along with substantial unreacted $La_2O_3$, and unreacted glass. The $La_2O_3$ disappears above 600° C., although unreacted glass is still present along with major amounts of two binary phases, $La_3PO_7$ and $LaP_3O_9$, and $LaPO_4$. Monazite increases rapidly in XRD intensity from 800 to 1000° C., while the two binary phases decrease rapidly in intensity over this same temperature range. Monazite is the sole crystalline phase at temperatures greater than or equal to 1000° C., and increases in XRD intensity with increasing reaction temperature. The rapid increase in monazite peak heights, and rapid decrease in $La_3PO_7$ and $LaP_3O_9$ peak heights suggest that, although not limited by theory, monazite formation occurs via a reaction:

$La_3PO_7$+$LaP_3O_9$→$4LaPO_4$

B. High Temperature Adhesive

1. Compatibility with SiC

Figure 6:
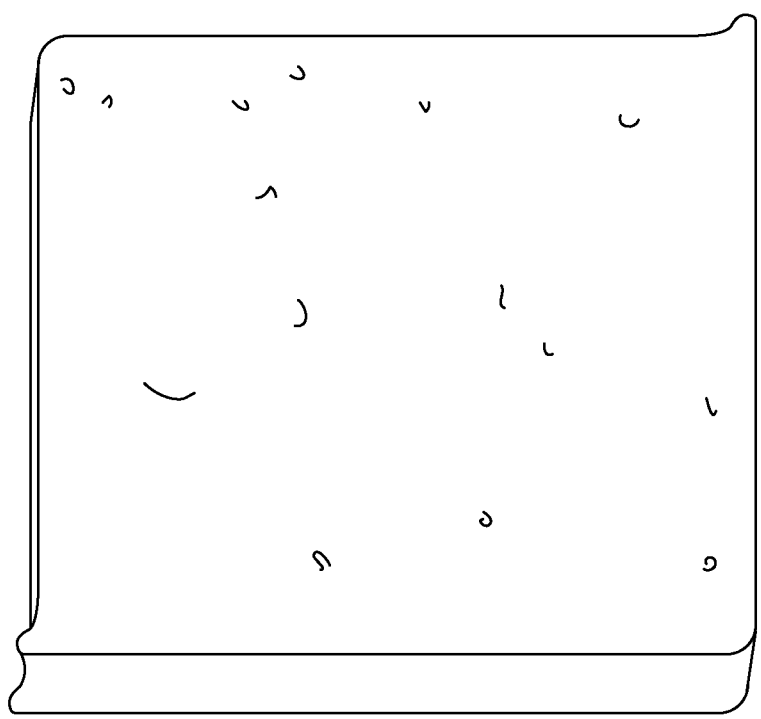
FIG. 6 shows a SiC test coupon coated with a reacted blend Example 5b and held 120 hrs at 1500° C.

Prior to conducting any sealing experiments with SiC, the compatibility of the monazite reactive-ceramming blends with SiC was first assessed. The initial evaluation consisted of coating a SiC coupon with a paste of the unreacted blend, firing it to 1500°, and then holding at this temperature for 120 hrs. FIG. 6 shows a test coupon of Example 5b following the test. The coating appears to be unaffected by the long time, high temperature, or contact with SiC. This confirms the disclosed monazite system's compatibility with high temperature and SiC.

2. Assessment of High Temperature Bonding and Hermeticity

Figure 7:
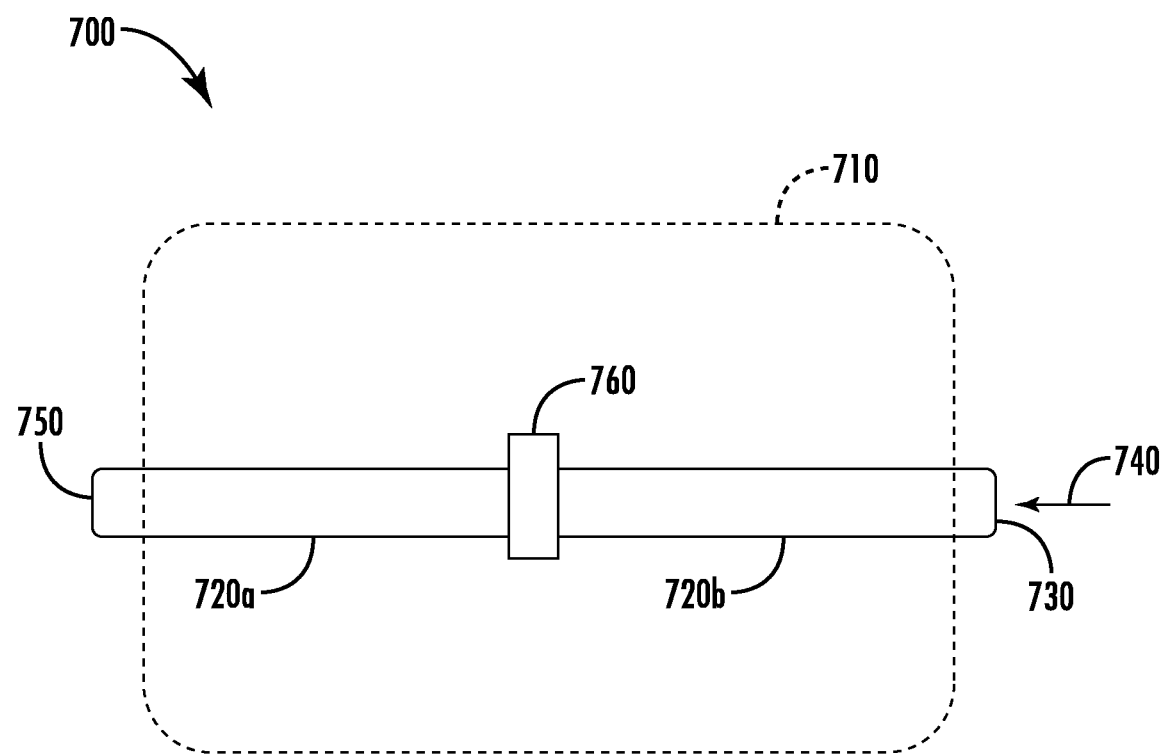
FIG. 7 shows a schematic of an assembly for testing high temperature hermeticity.

A suitable sealant used for joining the SiC pipe sections together is preferably capable of forming a seal that is hermetic following both high temperature exposure and high temperature thermal cycling. Test assemblies were constructed of two SiC tubes (one with a closed end) bonded by the reactive ceramming blend. Following joining at 1500°, the individual assemblies were then placed in a cycling furnace, pressurized with He, and then thermally-cycled for 150 cycles between 1200° and 1500° (FIG. 7). A leak rate less than $1.00 \times 10^{-1}$ atm·cm$^3$/s was considered acceptable.

Figure 8C:
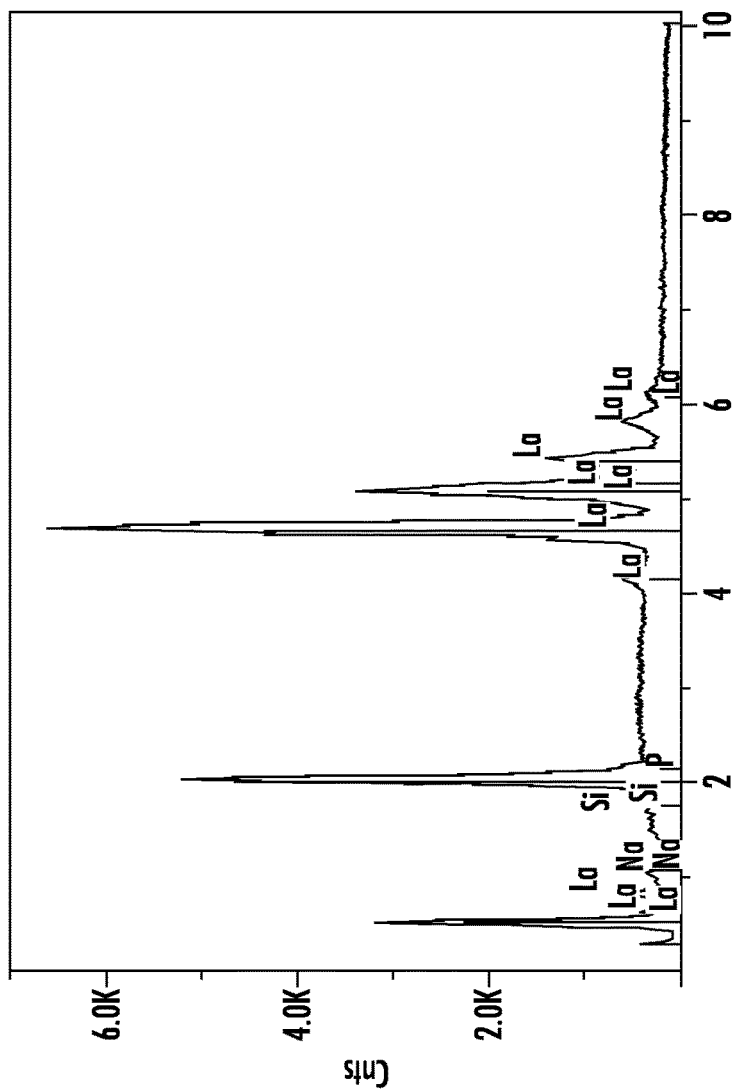
FIGS. 8A to 8C shows SEM (FIGS. 8A and 8B) and EDAX scan (FIG. 8C) of stoichiometric reaction couple after a failed hermeticity test.
Figure 8A:
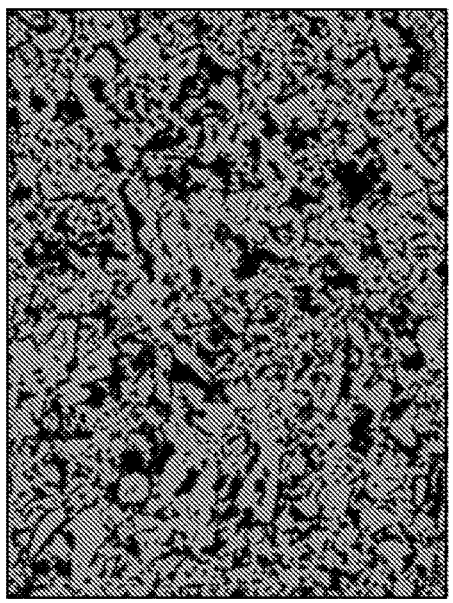
Figure 8B:
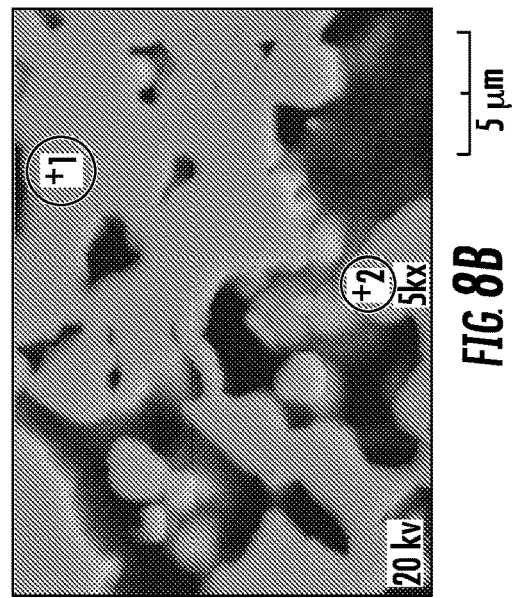

Initial evaluation of the blend of Example 5b in this test showed an initially low leak rate which then increased to greater than $1.00 \times 10^{-1}$ atm·cm$^3$/s after a few dozen cycles. The reason for the poor hermeticity performance is seen in the SEM microstructure shown in FIGS. 8A (500 micron) and 8B (50 micron) of the frit seal region of the actual test sample. The SEM (FIGS. 8A to 8B) shows a highly crystalline, single phase, but porous microstructure. EDAX (energy dispersive x-ray analysis) shown in FIG. 8C of sites "+1" and "+2" (circles added) in the SEM image of FIG. 8B indicates a La/P ratio of approximately 1, further indicating that the single phase is LaPO$_4$, or monazite.

Figure 9:
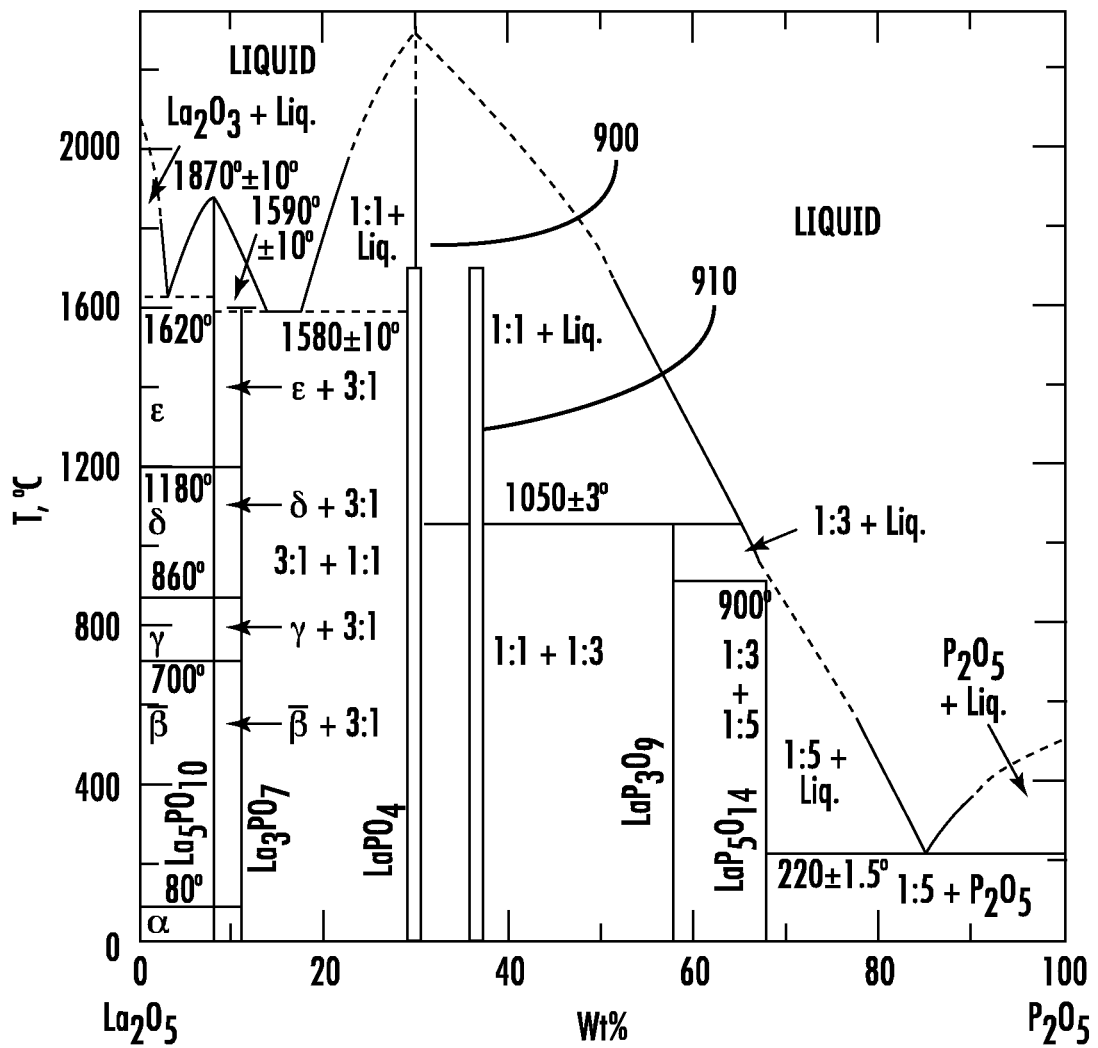
FIG. 9 shows a $La_2O_3$—$P_2O_5$ binary phase diagram for a stoichiometric blend (900) of pure monazite; and a phase assemblage for an off-stoichiometric monazite blend of Example 6 (910).

FIG. 9 shows a La$_2$O$_3$—P$_2$O$_5$ binary phase diagram showing: a stoichiometric or equilibrium blend (900) of pure monazite comprised of 30 wt % La$_2$O$_3$ and 70 wt % P$_2$O$_5$; and a phase assemblage for an off-stoichiometric blend of Example 6 (910): liquid and monazite at a temperature greater 1050° C., and monazite and LaP$_3$O$_9$ at a temperature less than 1050° C.

The poor high temperature hermeticity was improved by moving away from the concept of phase pure monazite to design a microstructure involving monazite and a second phase which is partially liquid at test temperatures. This was accomplished with reactive-ceramming blend Example 6, which was designed to form a two phase mixture consisting of approximately ⅔ LaPO$_4$ (monazite) and ⅓ LaP$_3$O$_9$ at temperatures less than 1050° C. At temperatures greater than 1050° C., the phase assemblage consisted of monazite and liquid.

TABLE 4

Off-stoichiometric blend of Example 6.

| Example | Wt. ratio of starting blends | | Wt. % | | Mole % | |
| --- | --- | --- | --- | --- | --- | --- |
| | 2 frit | La$_2$O$_3$ | La$_2$O$_3$ | P$_2$O$_5$ | La$_2$O$_3$ | P$_2$O$_5$ |
| Example 6 (repeat of Example 5) | 75 | 25 | 62.2 | 37.8 | 41.8 | 58.2 |

Figure 10:
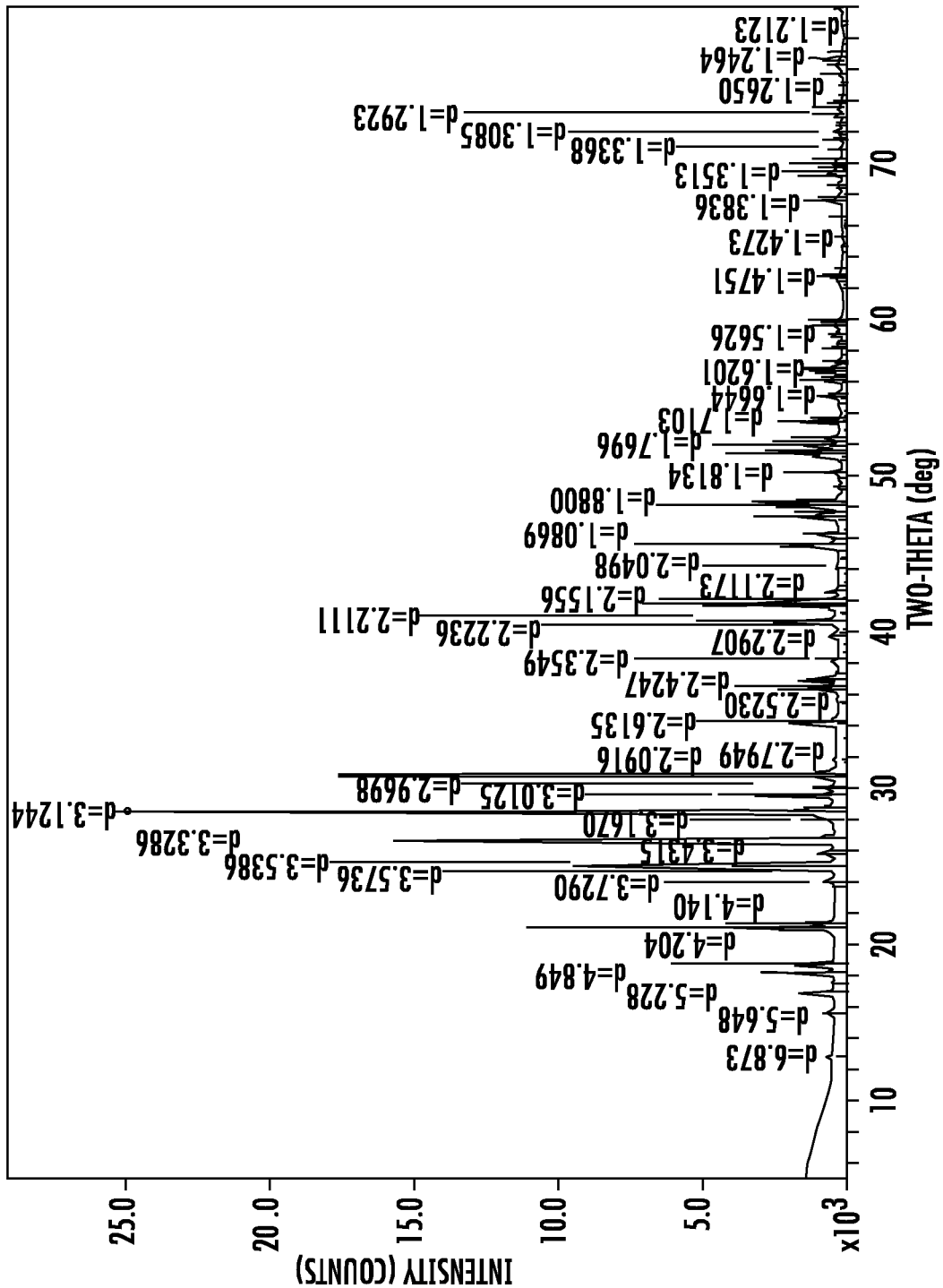
FIG. 10 shows a reaction couple Example 6 after firing to 1500° C. for 4 hr. Monazite is the major crystalline phase along with minor amounts of $LaP_3O_9$.

An XRD of reactive-ceramming couple Example 6 after firing to 1500° is shown in FIG. 10. Monazite is the major phase observed, with minor amounts of LaP$_3$O$_9$, in agreement with the phase diagram.

Figure 11:
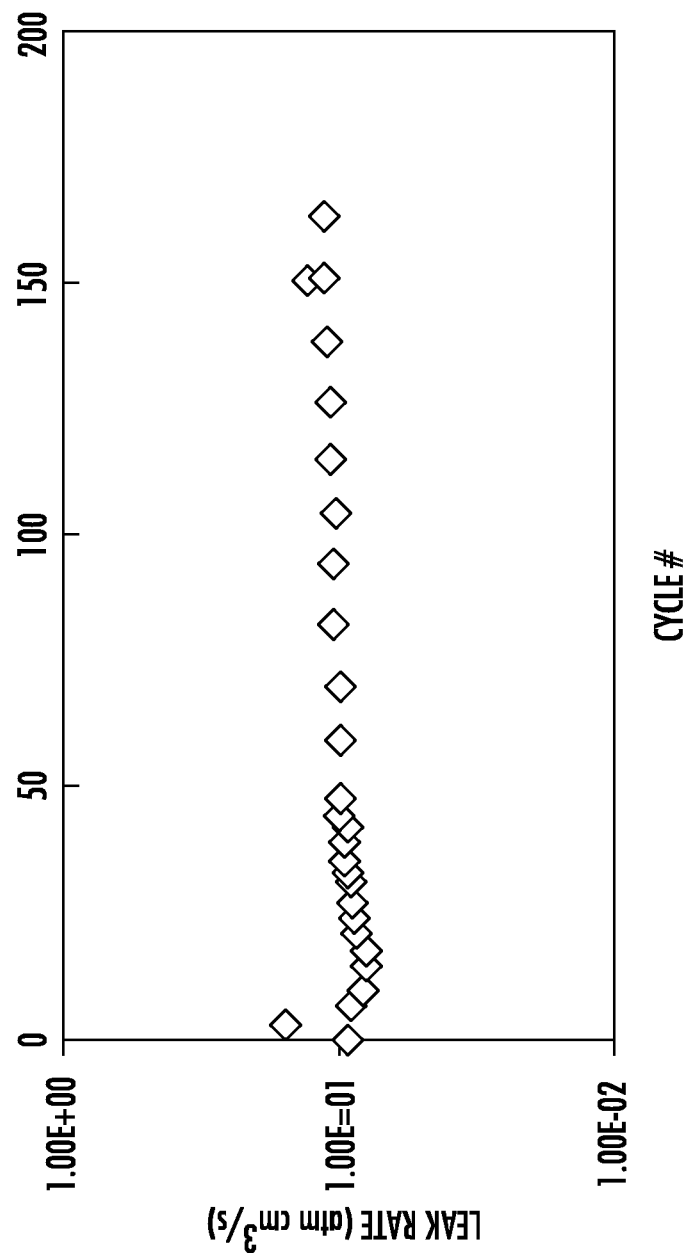
FIG. 11 shows the leakage rate vs. cycle number test performance of blend Example 6.

Hermeticity results for a reactive-ceramming couple using the test set-up shown in FIG. 7 are shown in FIG. 11. FIG. 7 shows a schematic of an assembly for testing high temperature hermeticity. The test assembly includes, for example, a furnace (700) that is thermally cycled between 1200 and 1500° C., a silicon carbide coupon (710), two silicon carbide tubes (720a, 720b) bonded to the silicon carbide coupon (710), one of the silicon carbide tube (720a) has a closed end (750), and the other silicon carbide tube (720b) has an open end (730), a source of helium gas (740) stream, and a reactive-ceramming blend composition (740) used to join (760) the ends of the tubes or seal (760) the tubes together. The seal satisfied the leakage requirement with a leak rate of $1.00 \times 10^{-1}$ atm·cm$^3$/s through 150 cycles of from 1200 and 1500° C.

Figure 12C:
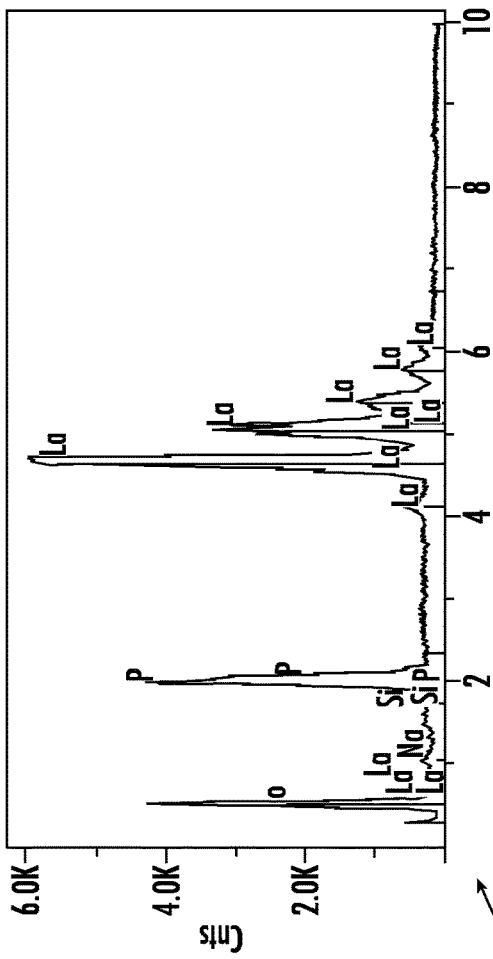
FIGS. 12A to 12D show SEM and EDAX scans of an off-stoichiometric blend of Example 6 of a seal after hermeticity testing.
Figure 12D:
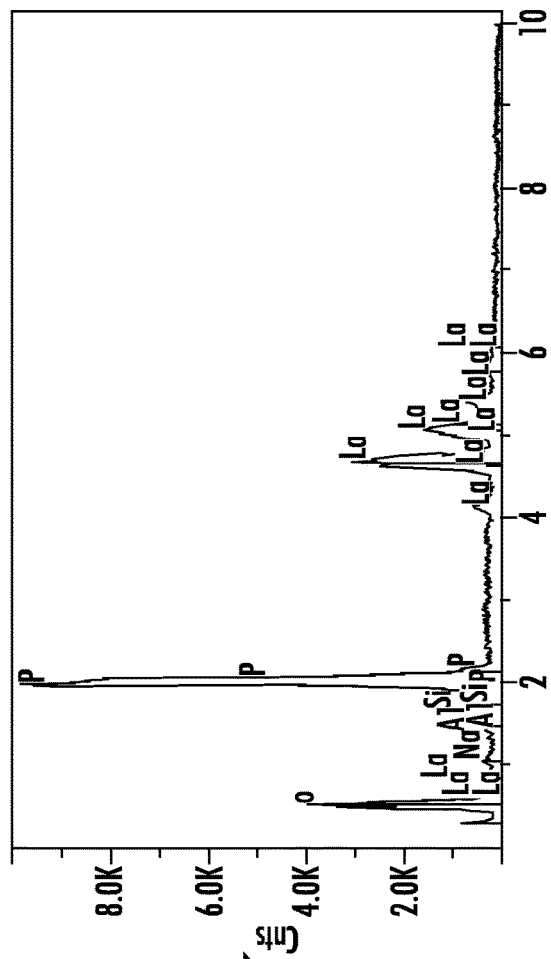
Figure 12A:
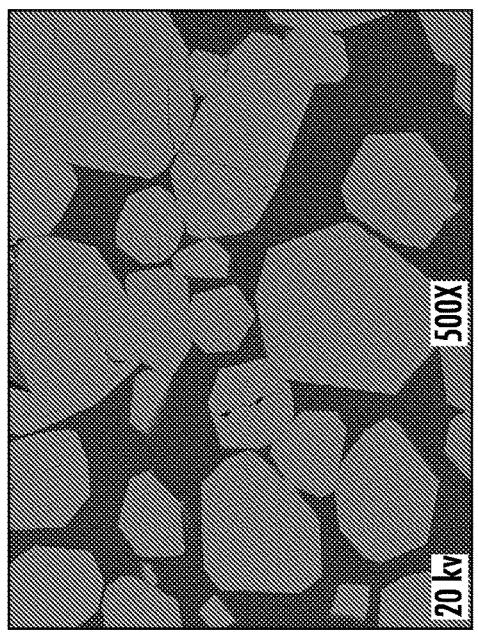
Figure 12B:
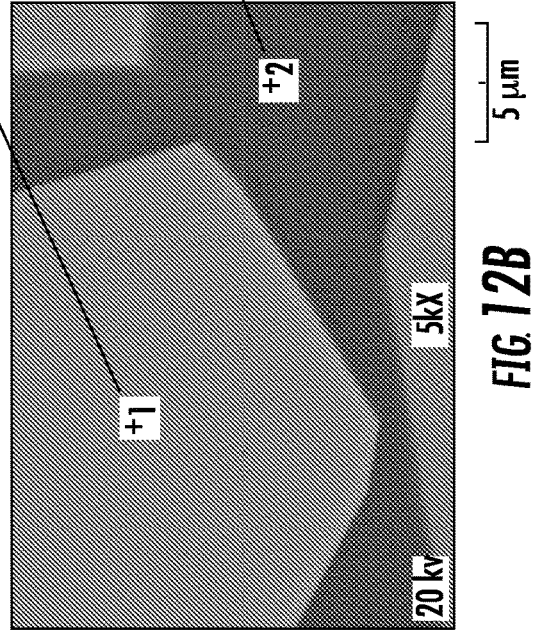

Although not limited by theory, a possible explanation for why the off-stoichiometric blend of Example 6 met the hermeticity/cycling requirement, while the phase-pure monazite blend did not, can be seen in FIGS. 12A to 12D, which shows SEM and EDAX scans of the test seal after completion of the leakage test. FIGS. 12A and 12B show SEM images of a two-phase microstructure at 500× and 5,000× magnification, respectively. FIGS. 12C and 12D show EDAX scans of bright phase (12C from site "+1" in 12B) and of dark matrix (12D from site "+2" in 12B) regions, respectively. FIGS. 12A and 12B show the microstructure of the seal after the test. A two phase microstructure can be observed, with a major phase consisting of large, bright angular crystals, within a matrix of a minor, dark phase. FIG. 12C shows an EDAX of one of the bright, angular crystals. The La/P ratio is approximately 1 for this phase, indicating that these crystals are monazite. EDAX results for the dark phase are shown in FIG. 12D. The La/P ratio for this phase is much less than 1, indicating that the dark phase corresponds to LaP$_3$O$_9$. As noted earlier, LaP$_3$O$_9$ melts incongruously at 1050° C. to form monazite and a liquid. This liquid forms a continuous matrix phase that results in the improved hermeticity of the off-stoichiometric monazite over the pure monazite.

EXAMPLES

The following Examples demonstrate making, use, and analysis of the disclosed composition and methods in accordance with the above general procedures.

Example 1

Example 1 was accomplished using the general procedure mentioned above (A. Synthesis of monazite) and in the amounts listed in Table 1. The resulting composition (La$_2$O$_3$:P$_2$O$_5$ mol %=20:80) was less than ideal because it was hygroscopic.

Example 2

Example 1 was repeated with the exception that the mole ratio or mol % of the components were slightly different. The resulting glass composition (La$_2$O$_3$:P$_2$O$_5$ mol %=30:70) of Example 2 was superior compared to Example 1 because the Example 2 product was not hygroscopic.

Example 3

Example 2 was repeated identically. The resulting composition (La$_2$O$_3$:P$_2$O$_5$ mol %=30:70) of Example 3, like Example 2, was also superior because it was not hygroscopic compared to Example 1.

Example 4

Example 1 was repeated with the exception that the weight ratio of reactants and conditions listed in Table 2, Example 4, were used. FIG. 3 shows a monazite reaction couple of the composition of Example 4 after firing to 1500° C. for 4 hr (with a 4 hr hold at 1200° C.). All peaks correspond to monazite, with the exception of a trace peak near 22° 2Θ (see overlay in FIG. 5). No residual glass appears to be present after firing.

Example 5

Figure 5:
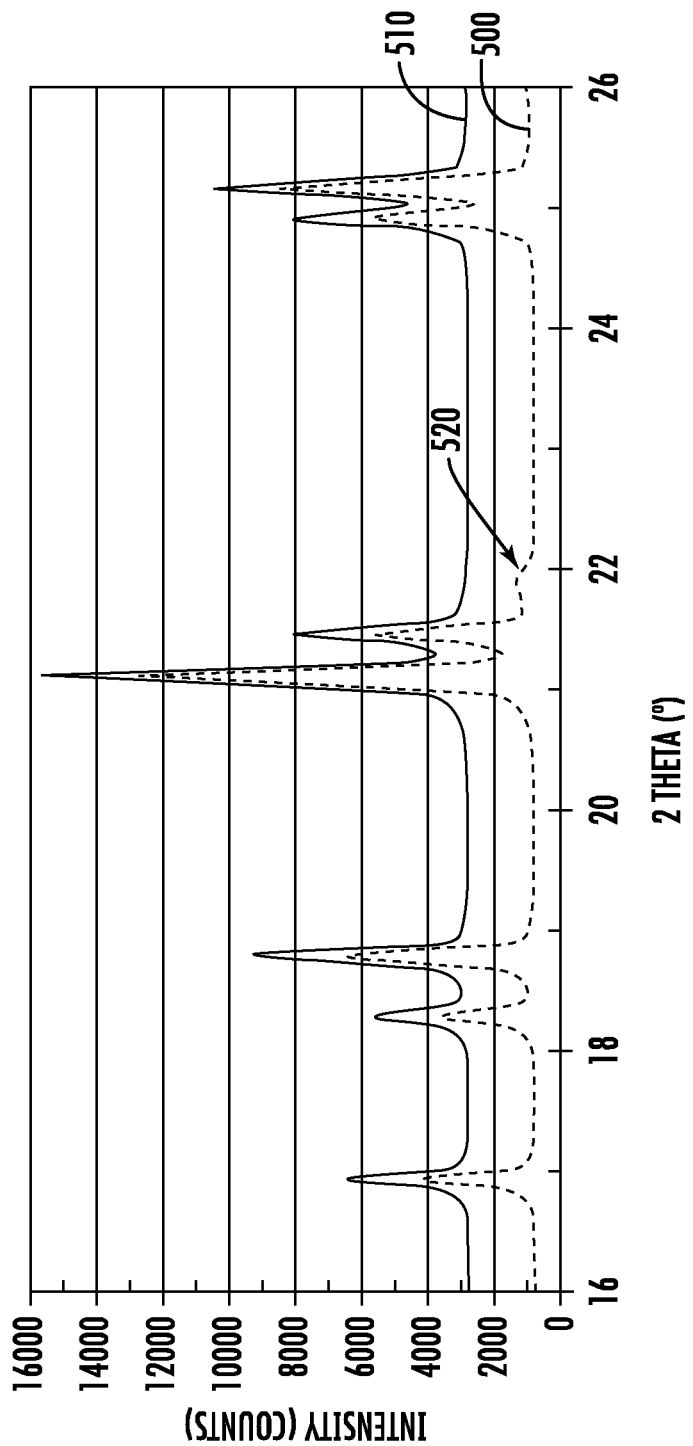
FIG. 5 shows overlay of portion of XRD patterns shown in FIGS. 3 and 4 for monazite reaction couples of Example 4 (500), and Example 5 (510).

Example 1 was repeated with the exception that the weight ratio of reactants and conditions listed in Table 2, Example 5, were used. FIG. 4 shows a monazite reaction couple of a sample of Example 5 after firing to 1500° C. for 4 hr (with a 4 hr hold at 1200° C.). All peaks are monazite. No residual glass appears to be present after firing. FIG. 5 shows overlay of portion of XRD patterns shown in FIGS. 3 and 4 for monazite reaction couples of Example 4, and Example 5. Note a very minor unidentified peak was present at about 22° 2Θ for the composition of Example 4 that was absent for the composition of Example 5.

Example 5b was repeated identically to Example 5, and the reaction sequence and XRD results for reaction couple are listed in Table 3.

Example 6

Example 6 was an identical repeat of Example 5, which produced a phase assemblage for an off-stoichiometric (i.e., non-equilibrium) blend of liquid and monazite (at a temperature greater 1050° C.), or monazite and $LaP_3O_9$ below 1050° C.

The disclosure has been described with reference to various specific embodiments and techniques. However, it should be understood that many variations and modifications are possible while remaining within the scope of the disclosure.

What is claimed is:

1. A method of joining and sealing two objects, comprising:
   contacting a first object and a second object with a sealing composition comprising a mixture of La-phosphate glass frit and a lanthanum source;
   a first heating of the contacted first object, the contacted second object, and the sealing composition at from 1200° C. to 1500° C., and holding at this temperature to densify the sealing composition for from 2 hours to 8 hours; and
   a second heating of the contacted first object, the contacted second object, and the sealing composition at from 1500° C. to 1600° C., and holding at this temperature for from 2 hours to 8 hours.

2. The method of claim 1, wherein the first object and the second object comprise different materials.

3. The method of claim 1, wherein the first object and the second object are selected from at least one of silicon carbide, aluminum oxide, zirconium, or combinations thereof.

4. The method of claim 1, wherein the first object and the second object are respective ends of furnace tubes.

5. The method of claim 1, wherein the first object and the second object are selected from sheets, tubes, rods, fibers, cylinders, or combinations thereof.

6. The method of claim 1, wherein the lanthanum source comprises $La_2O_3$ or $LaCO_3$.

7. The method of claim 1, wherein the La-phosphate glass frit comprises $La_2O_3:P_2O_5$ in a mole ratio of from 25:75 to 20:80.

8. The method of claim 1, wherein the La-phosphate glass frit particles are prepared by:
   melting a mixture of $La_2O_3:P_2O_5$ in a mole ratio of from 25:75 to 20:80 at a suitable melting temperature $T_{melt}$; and then
   pouring, rolling, and milling the resulting melt mixture to form the La-phosphate frit particles of a suitable particle size,
   wherein $T_{melt}$ is greater than $T_1$, and the suitable melting temperature $T_{melt}$ is from 1400° C. to 1700° C.

9. The method of claim 8, wherein the lanthanum source comprises $La_2O_3$ or $LaCO_3$.

10. The method of claim 1, wherein the first object and the second object comprise the same material.

11. The method of claim 1, wherein the sealing composition exhibits a leak rate of less than or equal to $1 \times 10^{-1}$ atm-cm$^3$/sec at 1200° C. to 1500° C.

* * * * *